(12) United States Patent
Schmidt (10) Patent No.: US 11,148,497 B2
(45) Date of Patent: Oct. 19, 2021

(54) DAMPER STILT WITH TWO HALF-SHELLS

(71) Applicants: ThyssenKrupp Bilstein GmbH, Ennepetal (DE); thyssenkrupp AG, Essen (DE)

(72) Inventor: Klaus Schmidt, Odenthal (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 70 days.

(21) Appl. No.: 16/655,524

(22) Filed: Oct. 17, 2019

(65) Prior Publication Data
US 2020/0122537 A1 Apr. 23, 2020

(30) Foreign Application Priority Data
Oct. 19, 2018 (DE) ...................... 10 2018 217 956.5

(51) Int. Cl.
*B60G 13/16* (2006.01)
*B60G 13/00* (2006.01)
*B60G 7/00* (2006.01)

(52) U.S. Cl.
CPC ............. *B60G 13/16* (2013.01); *B60G 7/001* (2013.01); *B60G 13/003* (2013.01); *B60G 2206/722* (2013.01); *B60G 2206/82* (2013.01)

(58) Field of Classification Search
CPC .... B60G 13/16; B60G 13/003; B60G 13/005; B60G 2204/129; B60G 2204/12;
(Continued)

(56) References Cited

U.S. PATENT DOCUMENTS 9,022,401 B1 * 5/2015 Rawlinson ............. B60G 11/28
280/124.125
9,073,397 B1 * 7/2015 Rawlinson ............... B60G 3/20
(Continued)

FOREIGN PATENT DOCUMENTS

DE 94 21 729 U 7/1996
DE 103 18 024 A 11/2004
(Continued)

OTHER PUBLICATIONS

Machine language translation of DE102014017979A1, obtained from espacenet.com on Feb. 12, 2021 (Year: 2016).*
(Continued)

*Primary Examiner* — James A English
*Assistant Examiner* — Mary E Young
(74) *Attorney, Agent, or Firm* — thyssenkrupp North America, LLC (57) ABSTRACT

A stilt part may be utilized for a suspension damper strut of the wheel suspension of a vehicle. The stilt part may comprise a shank portion extending along a longitudinal axis of the stilt part and a connecting portion adjoining an end of the shank portion. The connecting portion may be configured to connect a lower link of the wheel suspension. The shank portion may include a convex region that is bent away from the longitudinal axis. The convex region may provide clearance for a drive shaft of a wheel. The shank portion may be formed from at least two shell elements that are connected, in some cases welded, together along at least one longitudinal seam.

20 Claims, 5 Drawing Sheets

(58) Field of Classification Search
CPC ........ B60G 2206/82; B60G 2204/4304; B60G 15/06; B60G 15/07
See application file for complete search history.

(56) References Cited

U.S. PATENT DOCUMENTS

2014/0027218 A1* 1/2014 Zietsch .................. F16F 9/065
　　　　　　　　　　　　　　　　　　　　　　　188/297
2020/0290420 A1* 9/2020 Hoiland ................ B21C 23/002

FOREIGN PATENT DOCUMENTS

| DE | 10318024 A1 | * | 11/2004 | ........... B60G 13/005 |
| DE | 102011000357 A1 | * | 8/2012 | .............. F16F 9/065 |
| DE | 102014017979 A1 | * | 6/2016 | ........... B60G 13/005 |
| KR | 20110059350 A | * | 6/2011 | ............. B60G 7/001 |

OTHER PUBLICATIONS

Machine language translation of DE10318024A1, obtained from espacenet.com on Feb. 12, 2021 (Year: 2004).*

* cited by examiner

DAMPER STILT WITH TWO HALF-SHELLS

CROSS-REFERENCE TO RELATED APPLICATION

This is a non-provisional application claiming priority to German Patent Application No. DE 10 2018 217 956.5, which was filed Oct. 19, 2018, the entire contents of which are hereby incorporated by reference herein.

FIELD

The present disclosure generally relates to dampers, including a stilt part for a suspension damper strut of a wheel suspension of a vehicle.

BACKGROUND

In wheel suspensions for vehicles, in particular motor vehicles, suspension damper struts or shock absorbers are installed in order to cushion or damp the movement of the vehicle body owing to forces acting on the wheels. Usually, suspension damper struts are connected in an articulated manner to the vehicle body at an upper end and to a link of the wheel suspension at a lower end. The damper is connected to the link in a pivotable manner via a connecting part, frequently known as a stilt.

Depending on the chassis of a vehicle, specific demands are made of a wheel suspension. The complex kinematics of a wheel suspension result in different load states for suspension damper struts or a stilt, which has to exhibit sufficient stiffness while at the same time having as low a weight as possible. In principle, a compact construction of a wheel suspension is required, wherein vehicle-specific spatial conditions, in particular the arrangement of various components of the wheel suspension with respect to one another, also have to be taken into consideration.

In the prior art, stilts are frequently manufactured as forged parts or as welded constructions made of individual parts, such as profiles, tubes or of flat steel.

German Patent Publication No. DE 94 21 729 U1 discloses a steerable wheel suspension for a front wheel having a suspension strut or damper strut, wherein the damper outer tube is provided with an extension that is connected at a forked end to the transverse link. The extension has two arms, between which the drive shaft for the wheel is passed.

German Patent Publication No. DE 103 18 024 A1 discloses a stilt having a shank and a fork, wherein the stilt comprises two longitudinally divided component portions. The shank portions lie against one another at a dividing joint and are connected together. The shank portion has the shape of a straight tube segment.

The stilts known from the prior art frequently have the drawback that they exhibit an unfavourable ratio between stiffness and weight, are complicated and expensive to produce, and/or do not allow a sufficiently compact construction of a wheel suspension.

Thus a need exists for a stilt part that has an improved ratio between strength or stiffness and weight, allows as much design freedom as possible for a wheel suspension, and has a low production cost.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to stilt parts, including stilt parts for a suspension damper strut of the wheel suspension of a vehicle and methods for producing such stilt parts.

In some examples a stilt part, which may be configured for a suspension damper strut of a wheel suspension of a vehicle, may include a shank portion extending along a longitudinal axis of the stilt part and a connecting portion adjoining the end of the shank portion, in particular for connecting to a lower link of the wheel suspension. The shank portion may comprise a convex region bent away from the longitudinal axis. The convex region may form in particular a clearance for a drive shaft of a wheel, and may be formed from at least two shell elements such as, for example, a first and a second half-shell element. The shell elements may be connected, in some cases welded, together along at least one longitudinal seam.

One aspect of the present disclosure is that a compact construction for a wheel suspension is achievable when the shank of a stilt part allows a clearance for a drive shaft for a wheel, and—in spite of the resultant geometrically more complex shape of the stilt part—good mechanical properties of the stilt part are achievable by manufacturing the stilt part from connected shell elements. In particular, the drive shaft for a wheel can be arranged such that it crosses the longitudinal axis of the stilt part. As a result of the stilt part being manufactured from shell elements, in particular by welding shell elements lying against one another, the stilt part is producible in a cost-effective manner and has in particular an improved strength or stiffness/weight ratio compared with known stilts. Furthermore, a stilt part according to the present disclosure can have good coating properties. As a result of the shank portion being formed from half-shell elements, the stilt part is particularly easy to produce, specifically in particular only from two shell elements.

A shell element can be understood according to the present disclosure to be a singly or multiply curved, in particular one-piece load-bearing component (support structure), in particular made of a metal material. Two or more shell elements can be provided, wherein more than one longitudinal seam can be provided. A half-shell element can be understood according to the present disclosure to be such a shell element, which, together with a single further (second) half-shell element, forms the shank portion. The shell elements or half-shell elements do not necessarily have to be formed or designed in an identical or symmetric manner. They can be produced in particular with different forming tools. In some examples, however, at least two shell elements, or both half-shell elements, are formed identically or are the same shape. A stilt part assembled from shell elements can be produced relatively cost effectively.

The convex region of the shank portion is provided in particular unilaterally, i.e. only on one side of the longitudinal axis. In particular, the shank portion does not branch above the connecting portion into convex regions formed on both sides. In this way, the stilt part is easy to mount from one side of a drive shaft, or vice versa, and a drive shaft does not have to be fitted through the stilt part, in particular through the shank portion. This results in a large amount of design freedom in the construction of a wheel suspension that is at the same time as compact as possible, said wheel suspension being both easy to mount and exhibiting the necessary degrees of freedom for the steering of a vehicle.

The at least one longitudinal seam (longitudinal weld seam) extends in particular along a joint between the shell elements, in particular between the two half-shell elements. With a longitudinal seam, or (elongate) shell portions extending along a longitudinal axis of the stilt part, a high strength of the stilt part in the main loading direction is achieved, the latter corresponding in particular to the axis of movement of a suspension damper strut, since potential mechanical weak points at the transition between individual components along the longitudinal axis are avoided.

In an advantageous development of the present disclosure, the connecting portion is in the form of a fork portion, in particular with at least two fork leg regions, or in the form of an eye portion with a through-opening. The eye portion can be configured as a tube portion, wherein in particular the cavity thereof forms the through-opening. The fork portion, or the eye portion, can be connected to the shank portion via weld seams.

In an advantageous development of the present disclosure, the shell elements, in particular the first and the second half-shell element, are deep drawn. By deep drawing, shell elements can be produced easily and favourably in complex, in particular singly or multiply curved, shapes, in particular from suitable sheet-metal blanks, in some cases made of sheet steel or sheet aluminium. The deep-drawn shell elements may exhibit an approximately constant wall thickness.

In an advantageous development of the present disclosure, the half-shell elements form the shank portion and the connecting portion, wherein one half-shell element forms in particular in each case at least one fork leg region of the fork portion. In particular, each half-shell element comprises an (upper) shank part portion and a (lower) fork part portion, wherein the shank part portions and fork part portions of the two half-shell elements each jointly form the (total) shank portion and the (total) fork portion, respectively, of the stilt part. In particular, the shank part portions and fork part portions of the half-shell elements are each configured in one piece. In this way, mechanically weakening connecting points between the shank portion and the fork portion, for example on account of changes in structure caused by joining, can be avoided. Between the shank (part) portion and the fork (part) portion, a transition region may be formed, which forms in particular a smooth or curved transition of the cross section of the convex region to the fork portion. The shape of the transition region is adapted in particular to the force flow under a particular load state, in some cases the main load state, of the stilt part. The fork leg regions may extend approximately parallel to one another. The spacing of the fork leg regions may be less than a width of the convex region.

In an advantageous development of the present disclosure, the at least one longitudinal seam extends along a neutral axis of the shank portion, in particular at least substantially in a centre plane of the shank portion or in a manner twisted through about (or exactly) 90° to the centre plane. A neutral axis extends in particular at a distance from the centre plane of the shank portion (locally parallel to the centre plane), in particular following the bend of the convex region away from the longitudinal axis (curved). The neutral axis of the shank portion is defined in particular by the bending load on the shank portion about a bending axis perpendicular to the longitudinal axis. The longitudinal seam may be configured as a longitudinal weld seam, in some instances as a butt weld. Other weld seam positions are also possible. The longitudinal seam is configured in particular in a plane of symmetry of the shank portion or of the stilt part. Alternatively, the longitudinal weld seam can be configured in a welding position offset through 90°, wherein in particular a (front) shell element towards the longitudinal axis and a (rear) shell element away from the longitudinal axis are connected together. In some examples, half-shell elements that are the same or identical are connected together by the, in some cases continuous, longitudinal weld seam. The longitudinal seam can also be interrupted, however, or be made up of individual weld spots or weld sections.

In an advantageous development of the present disclosure, two opposite fork leg regions of the fork portion define fork eyes that define a fork axis, which extends at least substantially parallel or perpendicularly to the centre plane of the shank portion. A centre plane can at the same time represent a plane of symmetry of the stilt part. The fork portion can be asymmetric to the centre plane of the shank portion, while the shank portion is symmetric, or vice versa. An example in which the fork axis extends parallel to the centre plane of the shank portion has the advantage that the fork portion is connectable (in a pivotable manner) to a pin, extending (at least substantially) perpendicularly to the drive shaft, of a link, in particular of a lower transverse link. In the case of a fork axis offset through 90° thereto, further possible applications (installation variants) arise for the stilt part. The fork eyes can be divided by a dividing line between shell elements, in particular half-shell elements. In particular, fork eyes can be (retrospectively) configured as bores in the stilt part.

In an advantageous development of the present disclosure, the shank portion comprises at least locally, in particular in the convex region, a closed cross-sectional profile, wherein two shell elements may be connected together along two opposite longitudinal seams. The cross-sectional profile can be closed along the entire length of the shank portion or circumferentially, i.e. around the circumference of the shank portion, in a part of the shank portion. For example, the cross-sectional profile can be closed circumferentially in an (upper) connection region and/or in the (lower) transition region of the shank portion, while it is open (on one side) in the convex region. A closed profile increases the stiffness of the shank portion.

In an alternative advantageous development of the present disclosure, the shank portion comprises at least locally a cross-sectional profile that is open on one side, and is in some instances U-shaped, said cross-sectional profile being open in particular in the convex region, in some cases towards the longitudinal axis. The cross-sectional profile can be open on one side along the entire length of the shank portion or in a part of the shank portion. A cross-sectional profile that is open on one side allows the welding of a longitudinal seam on both sides, wherein in particular only a single longitudinal seam (on the front or rear side) is necessary. A U-profile or a V-profile can exhibit different opening angles, either towards the longitudinal axis or away from the longitudinal axis, for example between 30° and 150°, between 60° and 130°, or between 90° and 120°. An opening angle of the cross-sectional profile, in particular in the convex region, is determinable to this end for example between a point of the shank portion in the centre plane and two points of the shank portion in a (perpendicular) cross-sectional plane. Shell elements that form, when joined together, a cross-sectional profile that is open on one side are easy to produce, in particular by deep drawing, and have a good stiffness/weight ratio. In particular, the two legs of a U-shaped cross-sectional profile contribute towards the stiffness, in particular the flexural stiffness (and torsional stiffness), of the stilt part.

In an advantageous development of the present disclosure, the shank portion comprises a cross-sectional profile that widens, in some cases in a bulbous manner, towards the middle of the shank portion in the longitudinal direction. In particular, the convex region exhibits the greatest width of the stilt part, wherein in particular the fork portion is offset towards the longitudinal axis with respect to the convex region. In particular, the convex region curves out laterally (on both sides). As a result, in particular the resilience of the stilt part with respect to buckling (and torsion) is increased.

In an advantageous development of the present disclosure, the shank portion and/or the connecting portion comprise longitudinal beads, in particular in the region of the fork leg regions and/or in the convex region. Alternatively or additionally, it is also possible for transverse beads to be provided at suitable points. Beads, in particular longitudinal beads, increase the stiffness of the stilt part, particularly with respect to buckling.

In an advantageous development of the present disclosure, the shell elements of the shank portion form, at an opposite end from the connecting portion, a connection region for a damper tube, wherein the connection region forms in particular a receiving edge formed in a recessed manner into the shank portion. The connection region is integrated in particular into the shank portion or into the connected shell elements that form the shank portion. The connection region may have a cylindrical basic shape. The receiving edge may be annular. In particular, a damper tube or some other connection region of a damper can be introduced or plugged (from above) into the stilt part, wherein it can be supported in particular at the receiving edge. The damper tube can be welded to the connection region, in particular by means of a (circumferential) fillet weld. Since the shell elements (directly) form the connection region, components of a suspension damper strut can be saved on and further potentially weakening connecting points can be avoided. Assembly is also simplified as a result and becomes more cost-effective.

The abovementioned object is furthermore achieved in particular by a method for producing a stilt part, in particular for a suspension damper strut of the wheel suspension of a vehicle, in particular a stilt part according to the present disclosure, comprising the following steps of:

forming, in particular deep drawing, at least one first and one second sheet-metal blank to form in each case one shell element, in particular to form a first and a second half-shell element, respectively, such that the shell elements each form a shank part portion extending along a longitudinal axis and a fork part portion adjoining the end of the shank part portion, wherein the shank part portion comprises a convex subregion bent away from the longitudinal axis, and connecting, in particular welding, the shell elements along at least one longitudinal seam in order to form a stilt part having a shank portion extending along a longitudinal axis and a connecting portion adjoining the end of the shank portion, wherein the shank portion comprises a convex region bent away from the longitudinal axis.

The connecting portion can be in the form of a fork portion, in particular having at least two fork leg regions, or in the form of an eye portion with a through-opening. In particular, the (two) shank part portions and the (two) fork part portions of each shell element or half-shell element (jointly) form, in the connected state, the shank portion and fork portion, respectively, of the stilt part. In some examples, the shell elements are not forged or welded together from individual elements, for instance, from flat steel or metal sheets, but rather are deep drawn. As a result, they form a unitary material structure and exhibit homogeneous mechanical properties, in particular a high strength and stiffness. Furthermore, a stilt part produced in such a way has low production costs and good coating properties, in particular on account of the unitary (smooth) surface of the deep-drawn shell elements.

The method according to the present disclosure can implement some or all of the method-related features that have been described in connection with the stilt part according to the present disclosure, and has similar advantages.

Figure 1A:
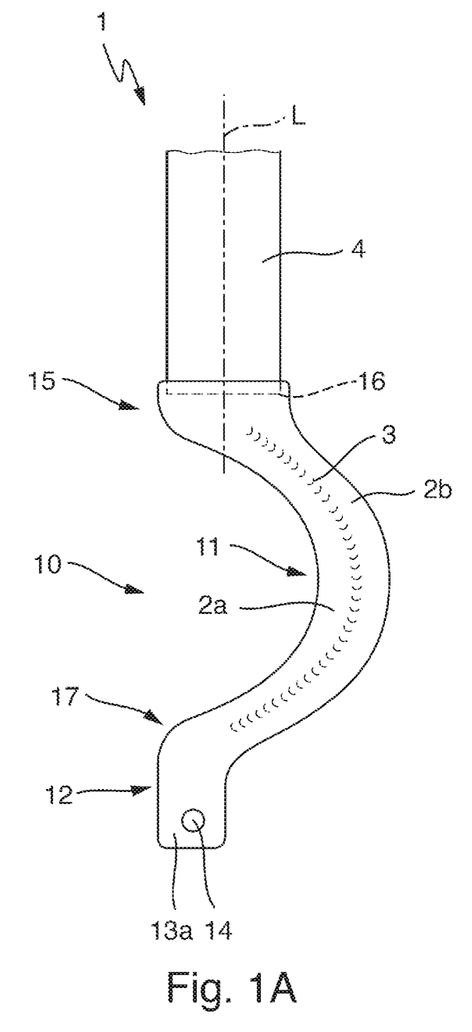
FIG. 1A is a side view of an example stilt part.
Figure 1B:
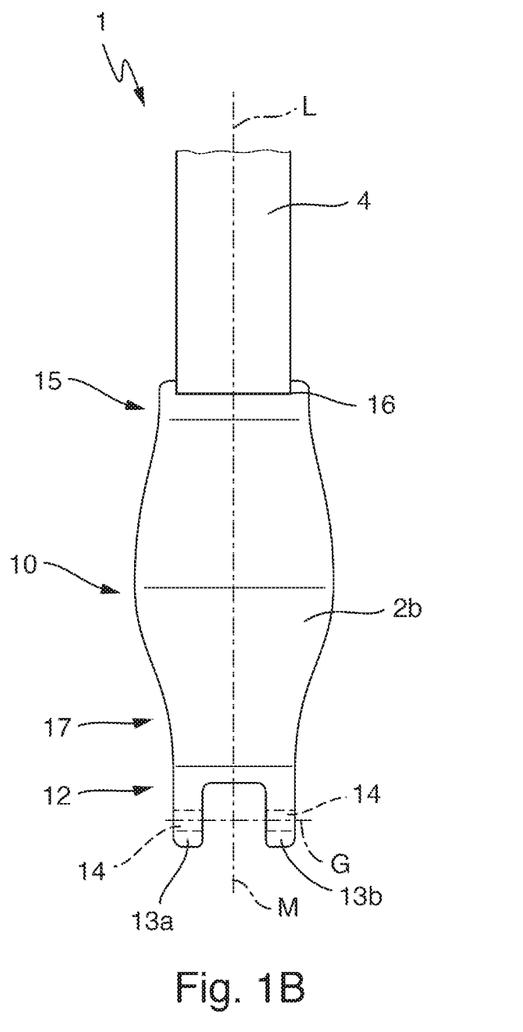
FIG. 1B is a rear view of the example stilt part of FIG. 1A.

FIGS. 1A and 1B show a first example of a stilt part 1 according to the present disclosure, in which the fork axis G extends perpendicularly to the centre plane M of the stilt part 1. The stilt part 1 has a shank portion 10, which extends along the longitudinal axis L, and a connecting portion 12. The connecting portion 12 is in the form of a fork portion. The shank portion 10 comprises an upper connection region 15, a central convex region 11 and a lower transition region 17, which forms a smooth or continuous transition between the shank region 10 and the fork portion 12. The fork portion 12 forms a downwardly open fork with two fork leg regions 13a, 13b. The fork leg regions have fork eyes 14, which define a fork axis G and may be configured as bores. The convex region 11 is bent away from the longitudinal axis L and creates a central clearance in the region of the longitudinal axis L.

The stilt part 1 can be used for a suspension damper strut of a wheel suspension of a vehicle. The clearance formed by the convex region 11 provides space for a drive shaft of a wheel of the vehicle and sufficient room for the steering movement. A damper tube 4 of a suspension damper strut is connectable at the connection region 15, as illustrated in the figures. For this purpose, an annular receiving edge 16 that is formed in a recessed manner on the inner side of the shank portion 10 is provided, said receiving edge being integrated into the shank portion 10. The damper tube 4, or damper outer tube, can be welded to the shank portion 10 on the outer side. Through the fork eyes 14, it is possible to fit a pin, via which the stilt part 1 is connectable in a pivotable manner to a link of a wheel suspension.

The stilt part 1 is formed by two half-shell elements 2a and 2b, respectively, which are welded together along a longitudinal seam 3 (schematically illustrated in FIGS. 1A and 1B). The shank portion 10 is hollow. The shell elements 2a, 2b are produced by a deep-drawing method from metal sheet parts and exhibit a substantially constant wall thickness. The shank portion 10 and the fork portion 12 of the stilt part 1 are each made up of the respective corresponding shank part portions and fork part portions of the half-shell elements 2a and 2b. In this way, the stilt part is configured in one piece, i.e. without connecting points in the transverse direction, in the longitudinal direction. As a result, it exhibits a high mechanical strength and stiffness and good coating properties.

The convex region 11 widens towards the middle of the shank portion 10 and curves out towards both sides (see FIG. 1B). The spacing of the fork leg regions 13a, 13b is less than the width of the convex region 11 and corresponds for example approximately to the diameter of the cylindrical connection region 15. In the region of the convex region 11, the shank portion 10 has a cross-sectional profile that is open on one side, i.e. is substantially U-shaped, and is open towards the side of the longitudinal axis L. As a result of the shaping of the convex region 11, increased flexural stiffness of the stilt part 1 with a simultaneously low weight is achieved.

Figure 2A:
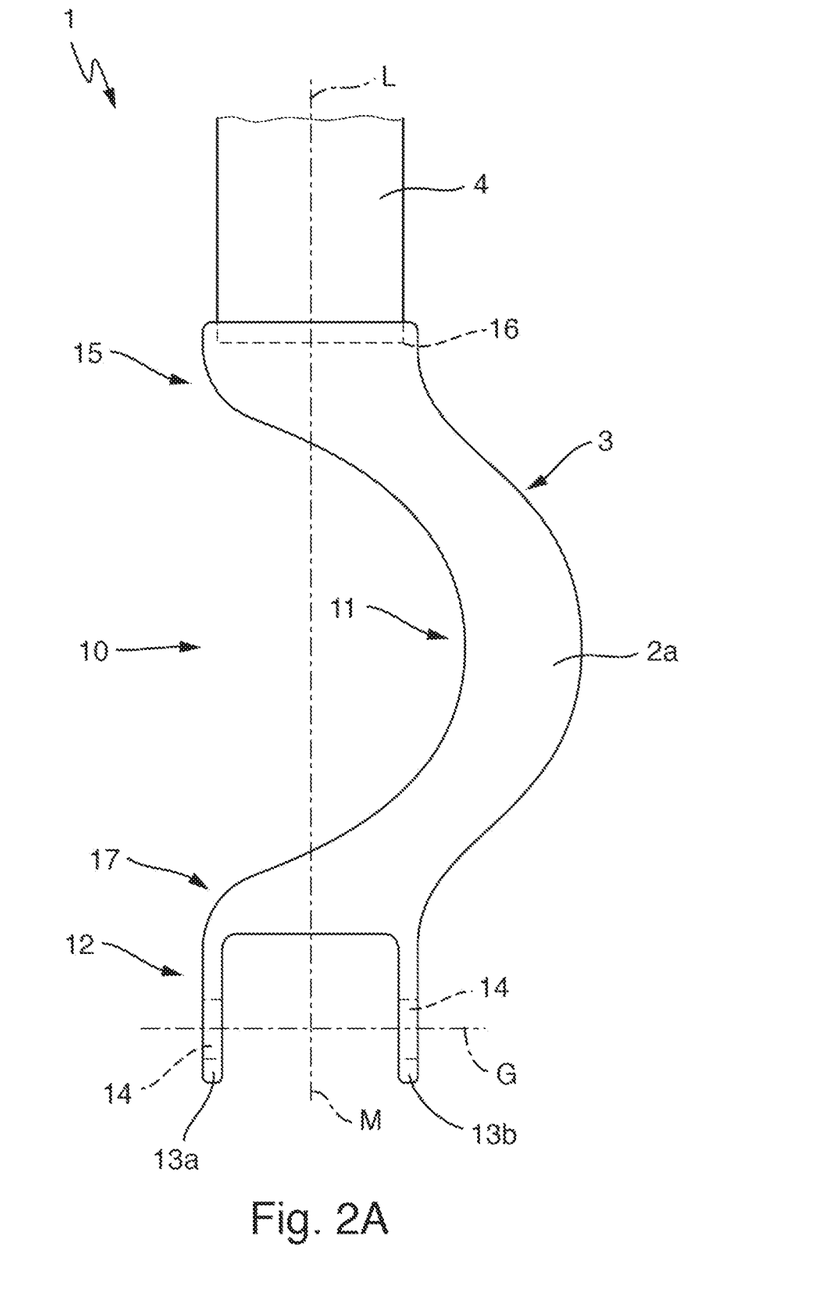
FIG. 2A is a side view of an example stilt.
Figure 2B:
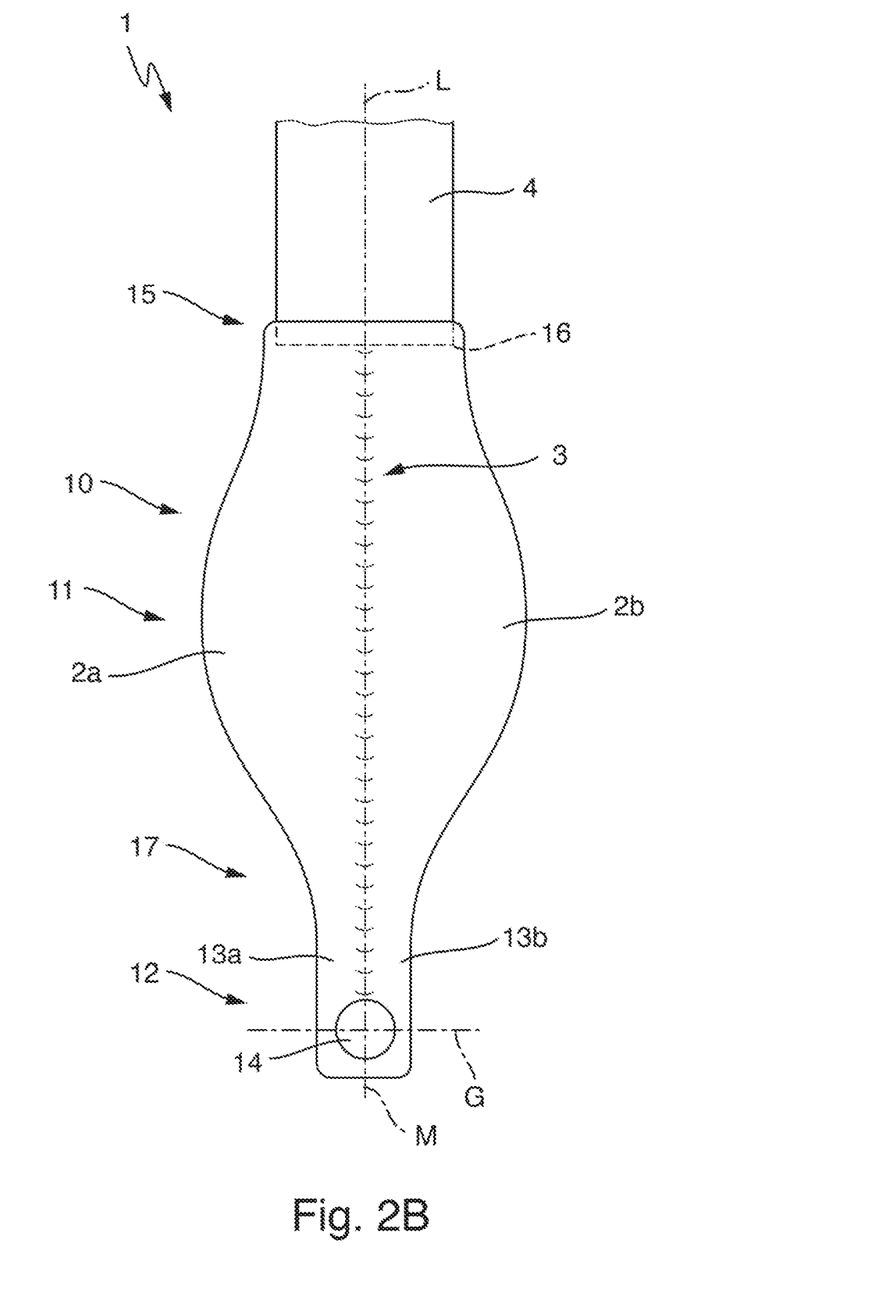
FIG. 2B is a rear view of the example stilt of FIG. 2A.

FIGS. 2A and 2B show another example of a stilt part 1 according to the present disclosure, in which the fork axis G extends parallel to the centre plane M. The longitudinal seam 3 extends as a butt weld on the rear side in the centre plane M along the entire length of the stilt part 1 and connects the two half-shell elements 2a and 2b together. The half-shell elements 2a and 2b are identically formed and in particular produced with the same forming tool. The fork eyes 14 are configured as bores. By way of the fork eyes 14, the stilt part 1 is connectable in a pivotable manner by means of a pin to a link of a wheel suspension, in particular a lower transverse link of a front wheel suspension. The stilt part 1 ensures, through its centrally convex or curved shape, a compact construction of a wheel suspension, since the drive shaft can cross the longitudinal axis in the installed state. Otherwise, the function and the effect correspond substantially to the example described in conjunction with FIGS. 1A and 1B.

Figure 3:
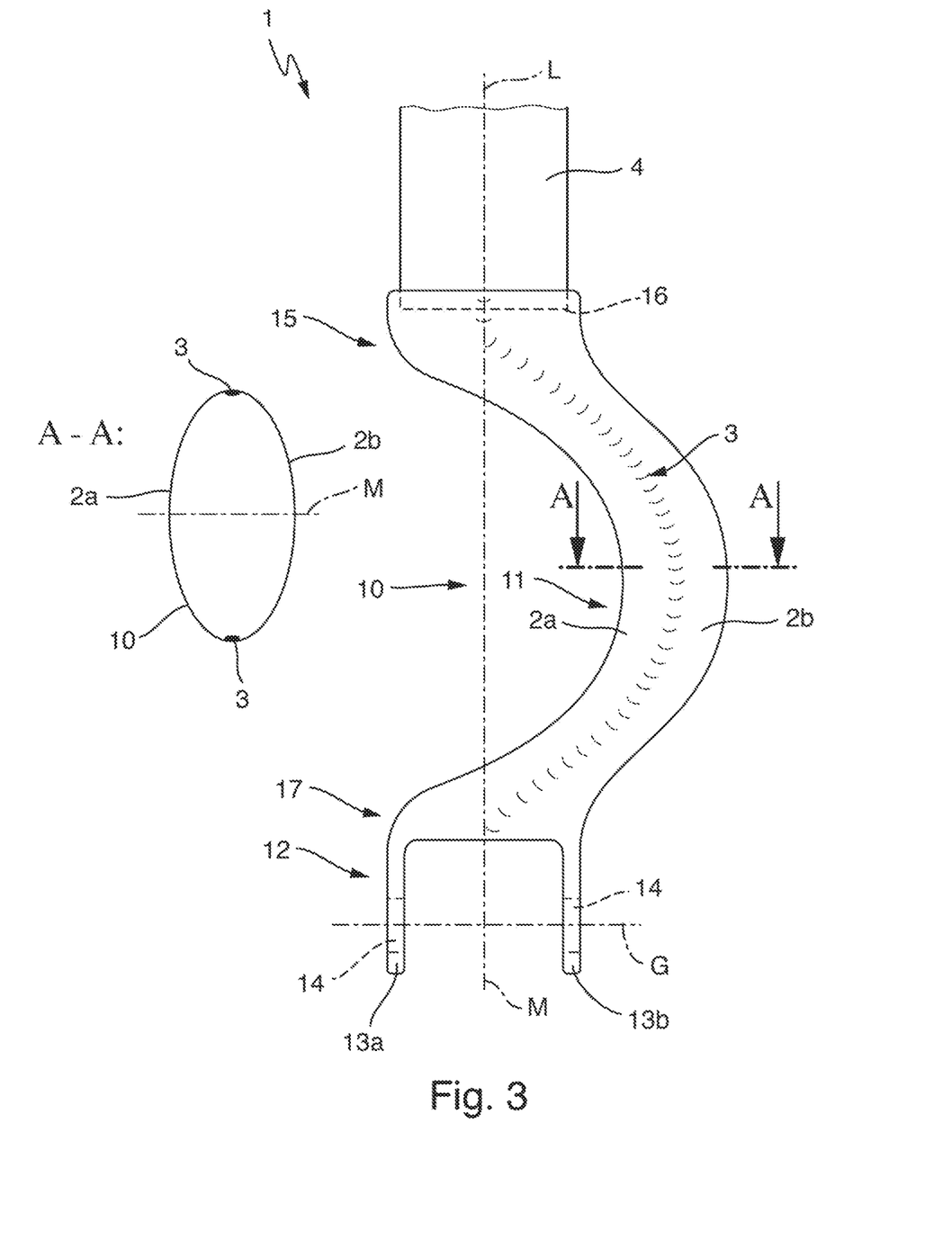
FIG. 3 is a side view of still another example stilt part, with a cross-section taken with respect to the section line A-A of the stilt part also shown.

FIG. 3 shows yet another example stilt part 1 according to the present disclosure, in which the fork axis G extends parallel to the centre plane M. The two longitudinal seams 3 extend as a butt weld in a manner twisted through 90° to the centre plane M on the two sides of the shank portion 10 and connect the two half-shell elements 2a and 2b together. The shank portion 10 comprises a closed, approximately oval cross section (see sectional illustration A-A), which is made up of the two half-shell elements 2a and 2b, which are welded together via two opposite longitudinal seams 3.

Figure 4:
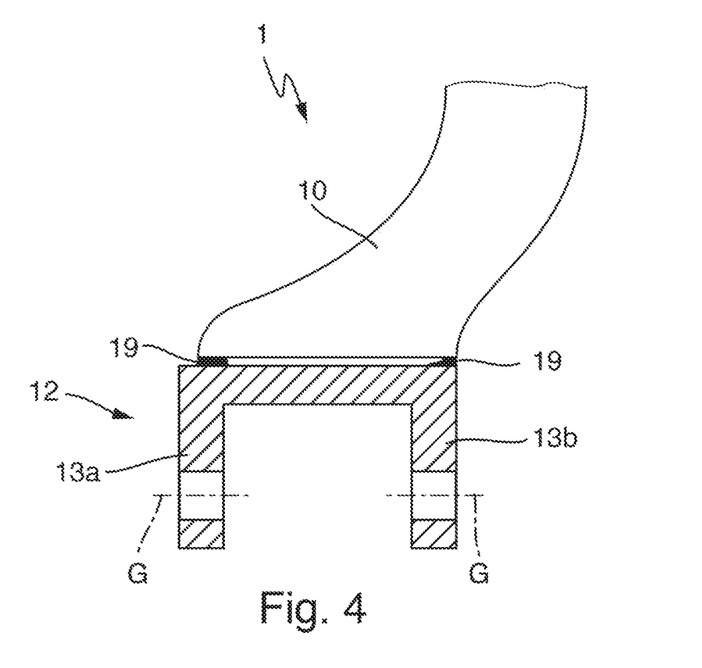
FIG. 4 is cross-sectional view of yet another example stilt with a fork portion.

FIG. 4 shows another example stilt part 1 according to the present disclosure, in which the connecting portion 12 is in the form of a fork portion with two fork leg regions 13a, 13b and fork eyes 14, which are oriented with a fork axis G. The fork portion is connected to the shank portion 10 via weld seams 19. The fork eyes 14 serve to receive a pin for connecting to a lower link of a wheel suspension.

Figure 5:
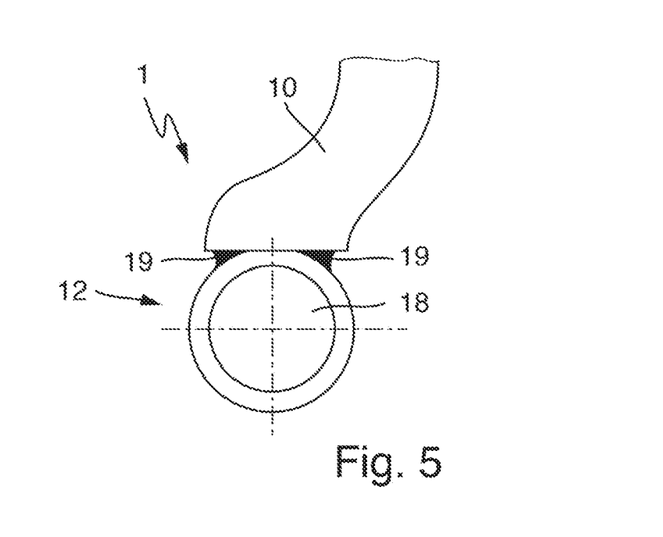
FIG. 5 is a detail view of another example stilt part with an eye portion.

FIG. 5 shows still another example stilt part 1 according to the present disclosure, in which the connecting portion 12 is configured as an eye portion. The eye portion is formed by a tube portion, the cavity of which forms the one through-opening 18, which serves as an eye for receiving a pin for connecting to a lower link of a wheel suspension. The tube portion is connected to the shank portion 10 via weld seams 19.

The stilt parts 1 illustrated in FIGS. 1A and 1B, and 2A and 2B, and in FIGS. 3, 4 and 5 are produced by the described method according to the present disclosure. In spite of the relatively complex form, they have sufficient stiffness and strength with a low weight.

LIST OF REFERENCE SIGNS

1 Stilt part
2a Shell element, in particular half-shell element
2b Shell element, in particular half-shell element
3 Longitudinal seam
4 Damper tube
10 Shank portion
11 Convex region
12 Fork portion
13a, 13b Fork leg region
14 Fork eye
15 Connection region
16 Receiving edge
17 Transition region
18 Through-opening
19 Weld seam
L Longitudinal axis
M Centre plane
G Fork axis

What is claimed is:

1. A stilt part for a suspension damper strut of a wheel suspension of a vehicle, the stilt part comprising:
a shank portion extending along a longitudinal axis of the stilt part, wherein the shank portion comprises a convex region that is bent away from the longitudinal axis, the convex region being configured to provide clearance for a drive shaft of a wheel, wherein the shank portion is formed from a first shell element and a second shell element, wherein the first and second shell elements are connected together along a longitudinal seam; and
a connecting portion adjoining an end of the shank portion, the connecting portion configured to connect to a lower link of the wheel suspension,
wherein a widest segment of a cross-sectional profile of the shank portion is disposed at a middle of the shank portion in the longitudinal direction, with the widest segment being free of any openings.

2. The stilt part of claim 1 wherein the first and second shell elements are welded together along the longitudinal seam.

3. The stilt part of claim 1 wherein the connecting portion is configured as a fork portion with at least two fork leg regions or as an eye portion with a through-opening.

4. The stilt part of claim 1 wherein the connecting portion is configured as a fork portion with at least two fork leg regions, wherein the first and second shell elements form the shank portion and the connecting portion, wherein the shell elements form the at least two fork leg regions.

5. The stilt part of claim 1 wherein a majority of the longitudinal seam extends in a center plane of the shank portion or extends in a manner twisted through about 90° to the center plane.

6. The stilt part of claim 5 wherein the connecting portion is configured as a fork portion with at least two fork leg regions, wherein the at least two fork leg regions are opposite one another and comprise fork eyes that define a fork axis, wherein the fork axis extends substantially parallel relative to the center plane of the shank portion.

7. The stilt part of claim 5 wherein the connecting portion is configured as a fork portion with at least two fork leg regions, wherein the at least two fork leg regions are opposite one another and comprise fork eyes that define a fork axis, wherein the fork axis extends substantially perpendicular relative to the center plane of the shank portion.

8. The stilt part of claim 1 wherein the longitudinal seam is a first longitudinal seam, wherein the shank portion comprises a closed cross-sectional profile, wherein the first and second shell elements are connected along two opposite longitudinal seams, one of which is the first longitudinal seam.

9. The stilt part of claim 1 wherein the shank portion comprises a cross-sectional profile that is open on a first side in the convex region.

10. The stilt part of claim 1 wherein at least one of the shank portion or the connecting portion comprises longitudinal beads.

11. The stilt part of claim 10 wherein the connecting portion is configured as a fork portion with at least two fork leg regions, wherein the longitudinal beads are disposed in at least one of the convex region of the shank portion or the at least two fork leg regions of the connecting portion.

12. The stilt part of claim 10 wherein at an opposite end from the connecting portion the first and second shell elements form a connection region for a damper tube, wherein the connection region forms a receiving edge configured in a recessed manner into the shank portion.

13. The stilt part of claim 1 wherein the shank portion and the connection portion are independent components that are connected via one or more weld seams.

14. The stilt part of claim 1 wherein the longitudinal axis lies in a center plane that passes through the convex region and divides the convex region of the shank portion into two symmetric halves.

15. The stilt part of claim 1 wherein the longitudinal axis lies in a center plane that passes through the convex region and divides the convex region of the shank portion into two symmetric halves, wherein the first and second shell elements are connected along two longitudinal seams that are equally spaced apart from the center plane, one of which is the first longitudinal seam.

16. The stilt part of claim 1 wherein the connecting portion is configured as a fork portion with two fork leg regions, wherein a widest continuous segment of the cross-sectional profile of the shank portion is disposed at the middle of the shank portion in the longitudinal direction, wherein an amount of space between the two fork leg regions is less than the widest continuous segment of the cross-sectional profile of the shank portion.

17. The stilt part of claim 1 wherein at a longitudinal midpoint of the convex region, the convex region has a closed cross-sectional profile.

18. A method for producing a stilt part for a suspension damper strut of a wheel suspension of a vehicle, the method comprising:
    forming a first sheet metal blank to form a first shell element and forming a second sheet metal blank to form a second shell element such that the first and second shell elements each form a shank part portion extending along a longitudinal axis and a fork part portion adjoining an end of the shank part portion, wherein the shank part portion comprises a convex subregion that is bent away from the longitudinal axis; and
    connecting the first and second shell elements along a longitudinal seam to form the stilt part that includes a shank portion that extends along the longitudinal axis and a connecting portion that adjoins an end of the shank portion, wherein the shank portion comprises a convex region that is bent away from the longitudinal axis, wherein the first and second shell elements are connected such that the first shell element forms an inner portion of the convex region and the second shell element forms an outer portion of the convex region and such that the longitudinal seam along which the first and second shell elements are connected follows a curvature of the convex region.

19. The method of claim 18 wherein the forming comprises deep drawing first and second sheet metal blanks to form the first and second shell elements.

20. A stilt part for a suspension damper strut of a wheel suspension of a vehicle, the stilt part comprising:
    a shank portion extending along a longitudinal axis of the stilt part, wherein the shank portion comprises a convex region that is bent away from the longitudinal axis, the convex region being configured to provide clearance for a drive shaft of a wheel, wherein the shank portion is formed from a first shell element and a second shell element, wherein the first and second shell elements are connected together along a longitudinal seam; and
    a connecting portion adjoining an end of the shank portion, the connecting portion configured to connect to a lower link of the wheel suspension,
    wherein the first half shell element forms an inner portion of the convex region and the second half shell element forms an outer portion of the convex region, wherein the longitudinal seam along which the first and second half shell elements are connected follows a curvature of the convex region.

* * * * *